(12) United States Patent
Sánchez Martínez et al.

(10) Patent No.: US 11,198,163 B2
(45) Date of Patent: Dec. 14, 2021

(54) METHOD FOR ENGRAVING ALUMINIUM SURFACES

(71) Applicant: ACR II Aluminium Group Cooperatief, U.A., Amstelveen (NL)

(72) Inventors: Segundo Antonio Sánchez Martínez, Amorebieta (ES); Ignacio Gil Fernández-Marcote, Amorebieta (ES); Salvador Antonio Marcilla Gomis, Amorebieta (ES)

(73) Assignee: ACR II Aluminium Group Cooperatief, U.A., Amstelveen (NL)

( * ) Notice: Subject to any disclaimer, the term of this patent is extended or adjusted under 35 U.S.C. 154(b) by 378 days.

(21) Appl. No.: 15/764,096

(22) PCT Filed: Sep. 22, 2016

(86) PCT No.: PCT/ES2016/070664
§ 371 (c)(1),
(2) Date: Mar. 28, 2018

(87) PCT Pub. No.: WO2017/055655
PCT Pub. Date: Apr. 6, 2017

(65) Prior Publication Data
US 2018/0272684 A1  Sep. 27, 2018

(30) Foreign Application Priority Data

Sep. 30, 2015 (ES) .................................. 201531396

(51) Int. Cl.
*B21B 1/22* (2006.01)
*B41F 19/02* (2006.01)
(Continued)

(52) U.S. Cl.
CPC ............... *B21B 1/227* (2013.01); *B21B 1/22* (2013.01); *B21B 1/38* (2013.01); *B21H 8/00* (2013.01); *B31F 1/007* (2013.01); *B41F 19/02* (2013.01); *B32B 15/20* (2013.01); *B32B 37/18* (2013.01); *B32B 38/06* (2013.01); *B32B 2311/24* (2013.01)

(58) Field of Classification Search
None
See application file for complete search history.

(56) References Cited

U.S. PATENT DOCUMENTS 2,639,660 A * 5/1953 Sunderhauf ............ D06N 7/001
101/23
3,245,851 A * 4/1966 Lloyd-Lucas ............ B44B 5/00
29/527.2
(Continued)

FOREIGN PATENT DOCUMENTS

DE 102009010081 A1 8/2010
EP 0945198 A2 9/1999
(Continued)

*Primary Examiner* — Jill E Culler
(74) *Attorney, Agent, or Firm* — The Webb Law Firm

(57) ABSTRACT

The invention relates to a method including very superficial embossing combined with superficial laminating, which involves a slight reduction in thickness, the method being applied to plates several millimetres thick and to aluminium sheets having a thickness of less than 0.3 mm, supplied, in either case, as independent plates or in a continuous roll.

9 Claims, 1 Drawing Sheet

(51) Int. Cl.
  *B21B 1/38* (2006.01)
  *B21H 8/00* (2006.01)
  *B31F 1/00* (2006.01)
  B32B 15/20 (2006.01)
  B32B 37/18 (2006.01)
  B32B 38/06 (2006.01)

(56) References Cited

U.S. PATENT DOCUMENTS

| | | | | |
|---|---|---|---|---|
| 5,250,364 | A * | 10/1993 | Hector, Jr. | B21B 1/227 |
| | | | | 428/687 |
| 6,143,386 | A | 11/2000 | Lorig et al. | |
| 6,187,455 | B1 | 2/2001 | Eschauzier | |
| 2005/0000262 | A1* | 1/2005 | Schreiber | B21B 1/227 |
| | | | | 72/197 |
| 2005/0115295 | A1 | 6/2005 | Pont | |
| 2005/0159281 | A1 | 7/2005 | Nishino et al. | |
| 2007/0295229 | A1 | 12/2007 | Sieffert et al. | |
| 2010/0242559 | A1* | 9/2010 | Saenz de Miera | B21B 1/38 |
| | | | | 72/207 |
| 2011/0183154 | A1* | 7/2011 | Denkmann | B21H 8/005 |
| | | | | 428/600 |
| 2011/0186712 | A1* | 8/2011 | Blenkhorn | B29C 33/68 |
| | | | | 249/115 |
| 2015/0273547 | A1* | 10/2015 | Wilhelm | B42D 25/324 |
| | | | | 428/687 |
| 2016/0200066 | A1 | 7/2016 | Boegli et al. | |

FOREIGN PATENT DOCUMENTS

| | | |
|---|---|---|
| EP | 1166905 A2 | 1/2002 |
| EP | 1557484 A2 | 7/2005 |
| EP | 1598138 A1 | 11/2005 |
| ES | 2372065 | 9/2007 |
| WO | 9749535 A1 | 12/1997 |
| WO | 2009150029 A1 | 12/2009 |
| WO | 2015028939 A1 | 3/2015 |

* cited by examiner

METHOD FOR ENGRAVING ALUMINIUM SURFACES

CROSS-REFERENCE TO RELATED APPLICATIONS

This application is the United States national phase of International Application No. PCT/ES2016/070664 filed Sep. 22, 2016, and claims priority to Spanish Patent Application No. P201531396 filed Sep. 30, 2015, the disclosures of which are hereby incorporated in their entirety by reference.

BACKGROUND OF THE INVENTION

Field of the Invention

The present invention relates to a method for engraving aluminium surfaces through laminating rollers. The method combines embossing and surface laminating techniques such that, while engraving the surface of an aluminium plate, the thickness of the plate is also reduced. The material used in the present invention is preferably aluminium and reference is made only to this material throughout the specification. However, in reality, the invention may be extended to other materials with similar properties which could be subjected to the laminating and engraving process.

The invention is especially applicable to the metallurgical industry and, in particular, to the laminated aluminium industry.

Description of Related Art

Laminated aluminium products are usually manufactured through the continuous reduction of the thickness of a metal plate in a laminating machine, in the case of direct casting, or of a coil, in the case of continuous casting, until the desired final thickness is achieved. There is the possibility of using special laminating cylinders that incorporate superficial engravings or patterns of a certain size at the macroscopic level and in millimetres, which make it possible to transfer the design of the pattern from the surface of the laminating cylinder onto the surface undergoing the laminating process. This process is known as embossing. In this case, the metal in a cross-section arrangement is deformed for aesthetic or functional reasons. Normally, the high levels of pressure needed to cause the deformation or relief can only be applied to thick materials, with a thickness of more than 1 mm and with a minimal reduction, resulting in very marked engravings. Alternatively, for thinner profiles, the deformation is usually applied through the use of male and female cylinders conveniently arranged and coupled in a synchronized manner. Examples of this type of products include embossed sheets or stucco finishes.

On the other hand, in the case of aluminium plates with thicknesses of less than 0.1 mm, known as aluminium foil, the existing technology consists in applying a transfer process on the sheet from the surface of an engraved steel roller, thereby transferring an image, design or pattern by means of a local deformation without affecting the original thickness of the aluminium and affecting both sides of the plate, forming a replicated image or a negative.

These types of industrial processes are already known in the state of the art. There are also disclosures related to the preparation of cylinders (engraving), synchronization techniques of male-female cylinders, etc.

WO9749535 describes a form for rotary printing, coating or embossing of laminated materials, wherein an elastomer layer is applied onto a machine with a cylindrical surface area with the layer machined and engraved at the outer circumference to result in a cylindrical shape after curing. WO9749535 also relates to the method of producing the form. The form according to WO9749535 is characterized in that the elastomer layer is formed of cold cure material. The engraving of the elastomer layer preferably is attained by laser engraving.

WO2009150029 develops the foil guiding process in a coating unit for transferring image forming layers from a transfer foil to a medium to be printed. To achieve this, the coating unit is equipped with a restricted-area pressing plate for transferring layers from the transfer foil. This allows the targeted control of the foil feed. The transfer foil is preferably guided past a pressing roll approximately tangentially to said roll and with a restricted width. Special delivery devices are provided for storing and delivering the foil.

Document EP1557484 describes a roll for embossing aluminium sheets, obtainable by subjecting a surface of a steel roll to at least the steps of:
  Blasting treatment,
  Electrolytic treatment with 1,000 to 20,000 C/dm2 of electricity, in which the steel roll is used as the anode,
  Metallic coating treatment.

The aluminium sheet embossing roll has on the surface thereof peaks, or asperities, which are of uniform height and very numerous. As a result, aluminium sheets obtained using such a roll, when employed as lithographic printing plate supports, have excellent printing characteristics, particularly a long life and high sensitivity.

WO2015028939 describes an embossing device for embossing packaging material which comprises a set of embossing rollers with male die and female die rollers co-operating with one another, the surface of which is provided with texture elements, wherein the texture elements (M6R6) on the surface of the female die roller (M6), which are assigned to the texture elements (P6E6) on the surface of the male die roller (P6) are not inversely congruent by an amount greater than 15 μm in axial and radial direction and the texture elements of the male die and female roller associated with one another comprise facets (F) for the purpose of local pressure elevation.

In all of these cases it is clear how traditional embossing techniques have the following limitations:
  superficial design of laminating rollers with abrupt, marked or macroscopic designs, in millimetres,
  irregular distribution of the thickness of the material, exhibiting reliefs that are cross-sectionally marked,
  incorporation of a negative image of the engraving on the back of the plate,
  reduction of the thickness of the material undergoing the laminating method that may involve changes in its mechanical properties,
  subsequent needs for additional steps, such as lithographic or textured prints by means of lacquer printers or intermediate coatings.

SUMMARY OF THE INVENTION

The present invention addresses of these problems through the application of a laminating method that also creates a superficial texturing with the following properties:
  special superficial design in laminating rollers based on local variations of roughness at a micrometrical level or through the combination of gloss/matte zones, uniform distribution of thickness throughout the material, with no cross-sectional reliefs, no negative image engraved on the back of the flat plate, slight reduction in the thickness of the material in the laminating method, which facilitates the transfer of images without affecting the mechanical properties, application of interesting functional details, as an aesthetic effect, in the subsequent processing of the resulting surface, such as anti-copying marks, watermarks or traceability marks, as well as special optical attributes including iridescent highlights or holographic patterns, among others, no changes in the processing of coils in terms of size, tolerances, winding tension or any other variable due to the absence of accumulated macroscopic deformations.

The present invention describes a laminating method that also performs a very superficial embossing, with the particularity that it is intended to be used both in aluminium sheets with thicknesses of less than 0.3 mm and in aluminium plates with thicknesses of up to several millimetres.

The steps of the method of the invention are the following:

a) Selecting a laminating cylinder with the desired characteristics in terms of steel hardness, geometric profile and crown.

b) Adjusting the cylinder to a Ra roughness between 0.02 and 0.25 microns.

c) Preparing the cylinder by incorporating micrometric patterns using laser, chemical or electrochemical techniques, blasting or projection, coating or any other technique that achieves the desired effect.

d) Adjusting the laminating process with the desired speed, pressure and lubrication properties depending on the type of design to be applied and the characteristics of the metal to obtain a reduction in the thickness of the material between 5 and 15%.

e) Positioning the material to be laminated at the infeed of the laminating machine.

f) Conducting the laminating process to achieve the engraving with the transferred design.

To complete the invention that is being described and to aid a better understanding of the characteristics of the invention according to an example of a preferred embodiment thereof, a set of drawings has been attached hereto where the following figures have been represented in an illustrative rather than limiting manner.

DESCRIPTION OF THE INVENTION

The present invention describes a new process for obtaining personalized surfaces. The method described is based on the use of micro-embossing on aluminium surfaces. The technique consists in engraving a working cylinder with a topographic design at a micrometric level. This implies changes in the superficial roughness of the final product. New engraving techniques and innovative superficial texturing methods, such as EDT (Electro Discharge Texturing), laser, blasting or chemical texturing, among others, make it possible to prepare steel cylinders with special surface designs that can reach a micrometric level of detail and precision. With a single working cylinder and by means of very superficial laminating cycles, which imply a reduction in thickness of 5-8%, it is possible to transfer the design of the laminating cylinder onto an aluminium surface of any thickness, no matter how small, from thicknesses of less than tenth of a millimetre to thicknesses of several millimetres.

Therefore, the present invention describes an embossing method that differs from traditional embossing mainly in the following aspects:

1. No macroscopic patterns defining the surface design. Aesthetic effects are obtained through a local variation in roughness at a micro scale.

2. Use of new texturing techniques combined with the transfer of designs through a superficial reduction of thickness through the laminating process, to thereby obtain more defined designs of a much higher quality.

3. Possibility of using aluminium plates of any thickness, from less than 0.1 mm to 1 mm or more.

4. No negative of the engraved image on the back of the plate. The superficial design is obtained with a superficial laminating cycle that produces a minimum reduction in thickness through the use of a single special cylinder in the upper area.

5. Precise dimensional control obtained in the resulting material, in terms of shape, flatness and profile, which are key parameters in continuous processes with aluminium coils, to the extent it is possible to control these variables through laminating, unlike in traditional embossing process, in which it is impossible due to the accumulation of deformations on the metal plate.

The surfaces developed by the method of the present invention are capable of being used in an infinite number of applications in the metallurgical industry, and in particular in the laminated aluminium industry in terms of aesthetics, and also in situations that require functional attributes, such as the following:

In facades, roofs, interior design, insulation and others, in the construction sector, Interior design in the automotive sector, Gloss and cosmetics in reflectors, light diffusers, cosmetic and decorative pieces, etc.

Other industrial products, such as caps, containers, etc.

Figure 1A:
FIGS. 1a to 1c represents a longitudinal sectional view of a plate of a material before being processed and with the final result in three different ways, depending on the embossing process applied.
Figure 1B:
Figure 1C:

FIGS. 1a to 1c represent a traditional engraving procedure of a plate using the embossing technique, wherein the result can be engraved on only one of the faces of the plate, as shown in FIG. 1a, or on both sides of the final plate. In the latter case, the result in the plate can have a constant thickness, as shown in FIG. 1b, or a variable thickness as shown in FIG. 1c, depending on the type of design desired.

Figure 2:
FIG. 2 represents a longitudinal sectional view of an aluminium sheet before being embossed and the final result.

FIG. 2 represents the same method, but applied to a sheet of metal. In these cases, for the purposes of maintaining the properties of the material and not weakening it excessively, the result is usually a constant thickness of the sheet with the engraving on both sides and with the back face of the sheet containing the negative image of the design.

Figure 3:
FIG. 3 represents a longitudinal sectional view of an aluminium plate before being processed and the final result obtained using the method of the invention.

FIG. 3 represents an aluminium plate or sheet before and after being subjected to an engraving process by applying the method of the present invention.

Figure 4:
FIG. 4 represents a longitudinal sectional view of an aluminium sheet before being processed and the final result obtained using the method of the invention.

FIG. 4 shows the same method as FIG. 3 is shown, but applied to a thin aluminium sheet, also known as foil, instead of to a sheet with an intermediate thickness.

FIG. 3 and FIG. 4 both show that the engraving is applied on only one of the faces and only on the surface, with the section remaining constant and homogeneous throughout the length and width of the material, while the other face remains flat and intact and maintains the properties of a laminated product.

The development of this type of surface finishes through the laminating of aluminium makes it possible to develop virtually any finish of interest for a specific customer, after mutually agreeing upon the desired design. The semi-finished product requires a lesser degree of surface treatment at the facilities of the customer. The inherent advantages of this proposal are clear, and include the following. First of all, the customer has a raw material that stands out from those provided by other competitors. The traceability of such material is tied to the design of the surface. The customer can cut out several steps of the manufacturing process and will not need to change anything in its own processes, for example during painting, as the usual specifications of the coil are preserved. With fewer intermediate steps, the expected final quality is much higher and exhibits a lower incidence of internal rejections due to the reduction of possible sources of defects from additional processes.

All these advantages allow customers to be in an advantageous competitive position, which makes the product obtained by the technique described in the present description to be of great interest.

It should be noted that, due to the absence of marked superficial patterns or patterns that imply a significant degree of deformation, as well as the fact of having a constant and well controlled section profile, the final laminated material can be processed and prepared in in cut coils, in sheets or in any usual format, without any kind of problems, as would happen with the material subject to traditional embossing. Key parameters in the specifications of aluminium, such as mechanical properties, thickness, tolerances and geometric attributes (tile, lateral tile, flatness, profile, winding tension, bags, etc.) remain uniform and stable over the entire length of the coil. The high levels of control required in the laminating process compared to a traditional embossing line, in which such control is non-existent, is essential for ensuring the quality in the processing of this type of surfaces. This involves an added value for the material and, therefore, would be of great interest to aluminium consumers with high quality standards.

With all these advantages, products manufactured based on the technology described above have a distinct commercial potential in terms of novelty and savings, and as a proposal for the development of new, differentiated and high-quality surfaces.

Finally, it should be noted that the present invention should not be limited to the embodiment described herein. Other configurations can be achieved by persons skilled in the art in view of the present description. Accordingly, the scope of the invention is defined by the following claims.

The invention claimed is:

1. A method for engraving an aluminium surface through a rolling process in a rolling mill, comprising the following steps:
   a) selecting a rolling cylinder to be used in the rolling process;
   b) adjusting the rolling cylinder to a Ra roughness between 0.02 and 0.25 microns;
   c) incorporating a micrometric-pattern engraving onto the surface of the rolling cylinder, which is to be transferred to the aluminium surface of a material to be rolled during the rolling process;
   d) controlling the following variables of the rolling process: speed, pressure and lubrication, to obtain dimensional control in the resulting rolled material and a reduction in the thickness of the material between 5 and 15%;
   e) positioning the material to be rolled and simultaneously engraved at the infeed of a rolling mill, the rolling mill including the rolling cylinder having the micrometric-pattern engraving; and
   f) conducting the rolling process with the rolling cylinder having the micrometric-pattern engraving in order to engrave a top surface of the material at the same time that the material is rolled and the material's thickness is reduced according to step d) while a bottom surface of the material remains flat and intact to obtain an engraved and rolled material, with the material's section being constant and homogeneous throughout the length and width of the material, thereby maintaining the mechanical properties of a rolled product in a rolling mill.

2. The method for engraving an aluminium surface according to claim 1, wherein the micrometric-pattern engraving of the rolling cylinder is performed on a surface of the rolling cylinder.

3. The method for engraving an aluminium surface according to claim 1, wherein the material to be rolled is provided in the form of coils.

4. The method for engraving an aluminium surface according to claim 1, wherein the material to be rolled is provided in the form of plates.

5. The method for engraving an aluminium surface according to claim 1, wherein the material to be rolled is selected between aluminium sheets and aluminium plates.

6. The method for engraving an aluminium surface of claim 5, wherein the aluminium sheet or the aluminium plate has a thickness of less than 1 mm.

7. A method for engraving an aluminium surface through a rolling process using at least a rolling cylinder of a rolling mill, wherein the method comprises the following steps:
   a) selecting the rolling cylinder and adjusting the rolling cylinder's roughness to be between 0.02 and 0.25 µm;
   b) providing a micrometric-pattern engraving onto the surface of the rolling cylinder, which is to be transferred to the aluminium surface during a rolling process;
   c) positioning an aluminium plate or sheet to be rolled at the infeed of the rolling mill including the rolling cylinder having the micrometric-pattern engraving;
   d) controlling the following parameters of the rolling process: speed, pressure and lubrication to obtain dimensional control in the resulting rolled aluminium plate or sheet and a reduction in the thickness of the aluminium plate or sheet between 5 and 15%; and
   e) conducting the rolling process with the rolling cylinder having the micrometric-pattern engraving in order to engrave a top surface of the material at the same time that the material is rolled and the material's thickness is reduced according to step d) while a bottom surface of the aluminium plate or sheet remains flat and intact to obtain an engraved and rolled aluminium plate or sheet, with constant and homogenous section throughout the length and width of the aluminium plate or sheet, thereby maintaining the mechanical properties of a rolled product in a rolling mill.

8. The method for engraving an aluminium surface of claim 7, wherein the aluminium plate or sheet has a thickness of less than 1 mm.

9. A method for engraving an aluminium surface through a rolling process using at least a rolling cylinder of a rolling mill, wherein the method comprises the following steps:
   a) selecting the rolling cylinder and adjusting the rolling cylinder's roughness to be between 0.02 and 0.25 µm;
   b) providing a micrometric-pattern engraving onto the surface of the rolling cylinder, which is to be transferred to the aluminium surface during a rolling process;
   c) positioning a material to be rolled at the infeed of the rolling mill including the rolling cylinder having the micrometric-pattern engraving, and the material to be rolled comprising the aluminium surface and having a thickness of less than 1 mm;
   d) controlling the following parameters of the rolling process including speed, pressure and lubrication to obtain dimensional control in the resulting rolled aluminium plate or sheet and a reduction in the thickness of the material between 5 and 15%; and
   e) conducting the rolling process with the rolling cylinder having the micrometric-pattern engraving in order to engrave a top surface of the aluminium surface of the material at the same time that the material is rolled and the material's thickness is reduced according to step d) while a bottom surface of the material remains flat and intact to obtain an engraved and rolled material, with the material's section being constant and homogeneous throughout the length and width of the material, thereby maintaining the mechanical properties of a rolled product in a rolling mill.

* * * * *